(12) United States Patent
Schoenberg et al.

(10) Patent No.: US 9,266,471 B2
(45) Date of Patent: *Feb. 23, 2016

(54) SYSTEMS AND METHODS FOR INDICATING THE PRESENCE OF A CHILD IN A VEHICLE

(71) Applicant: Cars-N-Kids LLC, St. Louis, MO (US)

(72) Inventors: Gregory B. Schoenberg, St. Louis, MO (US); Robert S. Steffen, Four Seasons, MO (US)

(73) Assignee: Cars-N-Kids LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/922,745

(22) Filed: Jun. 20, 2013

(65) Prior Publication Data

US 2013/0278408 A1  Oct. 24, 2013

Related U.S. Application Data

(63) Continuation of application No. 13/490,094, filed on Jun. 6, 2012, now Pat. No. 8,477,024, and a continuation of application No. 12/335,421, filed on Dec. 15, 2008, now Pat. No. 8,212,665.

(60) Provisional application No. 61/013,929, filed on Dec. 14, 2007.

(51) Int. Cl.
| | |
|---|---|
| *G08B 21/00* | (2006.01) |
| *B60Q 9/00* | (2006.01) |
| *B60N 2/00* | (2006.01) |
| *G08B 21/22* | (2006.01) |
| *G08B 25/00* | (2006.01) |
| *G08B 21/24* | (2006.01) |

(52) U.S. Cl.
CPC ........ *B60Q 9/00* (2013.01); *B60N 2/002* (2013.01); *G08B 21/22* (2013.01); *G08B 21/24* (2013.01); *G08B 25/009* (2013.01)

(58) Field of Classification Search
CPC ........ B60N 2/002; B60N 2/26; B60R 21/015; G08B 21/22
USPC .............. 340/573.1, 573.4, 584, 457, 521; 307/9.1, 10.1
See application file for complete search history.

(56) References Cited

U.S. PATENT DOCUMENTS

| | | | |
|---|---|---|---|
| 5,790,031 A | 8/1998 | Shelton et al. | |
| 5,793,291 A | 8/1998 | Thornton | |
| 5,966,070 A | 10/1999 | Thornton | |
| 6,236,333 B1 | 5/2001 | King | |
| 6,366,200 B1 | 4/2002 | Aoki | |

(Continued)

FOREIGN PATENT DOCUMENTS

WO        2009079477 A2       6/2009

OTHER PUBLICATIONS

International Search Report, International Patent Application No. PCT/US13/50610, mailed on Oct. 14, 2013, 13 pages.

(Continued)

*Primary Examiner* — Mark Rushing
(74) *Attorney, Agent, or Firm* — Lewis Rice LLC (57) ABSTRACT

Systems and methods which provide for an alarm or notification that a child is in a car seat. The systems generally determine if a child is in the seat and that the seat, and therefore the vehicle, is not in motion. Upon detecting both situations, the notification or alarm is activated.

10 Claims, 8 Drawing Sheets

(56) References Cited

U.S. PATENT DOCUMENTS

| | | |
|---|---|---|
| 6,448,895 B1 | 9/2002 | Ekkel |
| 6,480,103 B1 | 11/2002 | McCarthy et al. |
| 6,794,590 B2 | 9/2004 | Federspiel |
| 6,798,084 B1 | 9/2004 | Gobel et al. |
| 6,819,247 B2 | 11/2004 | Birnbach et al. |
| 6,819,249 B1 | 11/2004 | Papp |
| 6,847,302 B2 | 1/2005 | Flanagan et al. |
| 6,850,824 B2 | 2/2005 | Breed |
| 6,868,734 B2 | 3/2005 | Jakoby et al. |
| 6,922,622 B2 | 7/2005 | Dulin et al. |
| 6,924,742 B2 * | 8/2005 | Mesina ............... 340/573.1 |
| 6,998,988 B1 | 2/2006 | Kalce |
| 7,009,522 B2 | 3/2006 | Flanagan et al. |
| 7,012,533 B2 | 3/2006 | Younse |
| 7,170,401 B1 | 1/2007 | Cole |
| 7,319,382 B1 | 1/2008 | Vu |
| 7,325,870 B2 | 2/2008 | Lawrence et al. |
| 7,348,880 B2 | 3/2008 | Hules et al. |
| 7,378,974 B1 | 5/2008 | Bassett et al. |
| 7,438,880 B2 | 10/2008 | Hung et al. |
| 7,457,695 B1 | 11/2008 | Fields et al. |
| 7,567,181 B1 | 7/2009 | Davison |
| 7,650,864 B2 | 1/2010 | Hassan |
| 7,701,358 B1 | 4/2010 | White et al. |
| 7,714,737 B1 | 5/2010 | Morningstar |
| 7,830,270 B1 | 11/2010 | Philbert |
| 7,994,906 B2 | 8/2011 | Salazar |
| 8,058,983 B1 | 11/2011 | Davisson et al. |
| 8,063,788 B1 | 11/2011 | Morningstar |
| 8,217,796 B2 | 7/2012 | Trummer |
| 2002/0118121 A1 | 8/2002 | Lehrman et al. |
| 2003/0098792 A1 | 5/2003 | Edwards et al. |
| 2003/0128107 A1 | 7/2003 | Wilkerson |
| 2003/0160689 A1 | 8/2003 | Yazdgerdi |
| 2003/0222775 A1 | 12/2003 | Rackham et al. |
| 2004/0011277 A1 | 1/2004 | Barnes et al. |
| 2004/0075581 A1 | 4/2004 | Staniszewski |
| 2005/0035862 A1 | 2/2005 | Wildman et al. |
| 2005/0068162 A1 | 3/2005 | Santa Cruz et al. |
| 2005/0137462 A1 | 6/2005 | Cho |
| 2005/0280297 A1 | 12/2005 | Patterson et al. |
| 2006/0049929 A1 | 3/2006 | Lawrence et al. |
| 2006/0103516 A1 | 5/2006 | Zang |
| 2006/0111821 A1 | 5/2006 | Wallner et al. |
| 2006/0208911 A1 | 9/2006 | Davis |
| 2007/0055428 A1 | 3/2007 | Kong et al. |
| 2008/0052259 A1 | 2/2008 | Shiffman et al. |
| 2008/0055064 A1 | 3/2008 | Keith et al. |
| 2008/0088437 A1 | 4/2008 | Aninye et al. |
| 2008/0164990 A1 | 7/2008 | Anderson |
| 2008/0167806 A1 | 7/2008 | Wheeler et al. |
| 2009/0234542 A1 | 9/2009 | Orlewski |
| 2009/0292423 A1 | 11/2009 | Norton |
| 2009/0303025 A1 | 12/2009 | Wahlstrom |
| 2010/0253498 A1 | 10/2010 | Rork et al. |
| 2010/0264706 A1 | 10/2010 | Vogt et al. |
| 2013/0021476 A1 | 1/2013 | Trummer |
| 2013/0049955 A1 | 2/2013 | Hoover et al. |
| 2013/0201013 A1 | 8/2013 | Schoenberg |
| 2013/0278408 A1 | 10/2013 | Schoenberg et al. |

OTHER PUBLICATIONS

Halo, "The Halo Baby Seat Safety System," http:/sistersofinvention.com/child_products/readch.html, printed on Jul. 18, 2012, 2 pages.

International Search Report, International Patent Application No. PCT/US2008/086882, mailed on Jun. 29, 2009, 11 pages.

International Search Report, International Patent Application No. PCT/US12/24529, mailed on Oct. 18, 2012, 10 pages.

International Search Report, International Patent Application No. PCT/US12/59583, mailed on Mar. 20, 2013, 11 pages.

"PMV16UN," Product Data Sheet, NXP B.V., http://www.nxp.com/documents/data_sheet/PMV16UN.pdf, Apr. 2011, 16 pages.

"Zeners BzX84C 3V3-BZX84C 33," Fairchild Semiconductor Corporation, http://www.fairchildsemi.com/ds/BZ/BZX84C9V1.pdf, 2001, 4 pages.

International Search Report, International Patent Application No. PCT/US2014/070752, mailed on Apr. 1, 2015, 12 pages.

International Search Report, International Patent Application No. PCT/US2015/020209, mailed on Jun. 1, 2015, 10 pages.

* cited by examiner

FROM FIG. 5D → Fig. 5E → TO FIG. 5F

FROM FIG. 5E → Fig. 5F

Fig. 6

SYSTEMS AND METHODS FOR INDICATING THE PRESENCE OF A CHILD IN A VEHICLE

CROSS REFERENCE TO RELATED APPLICATION(S)

This application is a Continuation of U.S. patent application Ser. No. 13/490,094, filed Jun. 6, 2012, which is in turn a Continuation of U.S. patent application Ser. No. 12/335,421, filed Dec. 15, 2008, now U.S. Pat. No. 8,212,665, which in turn claims the benefit of U.S. Provisional Application No. 61/013,929 filed Dec. 14, 2007. The entire disclosure of all the above documents is herein incorporated by reference.

BACKGROUND OF THE INVENTION

1. Field of the Invention

This disclosure relates to the field of safety devices for detection of unattended children within a vehicle.

2. Description of Related Art

Every summer there are stories on the news of children being inadvertently left in vehicles by a parent or guardian. Many of these stories have a relatively happy ending as the child is noticed by a passerby, rescued from the vehicle before suffering any adverse consequences, and the grateful parent discusses how thankful they are for others being observant. The more tragic stories result in the avoidable death of a child and generally the devastation of a family.

One thing that these stories often bring to a forefront of discussion is whether the potential danger present from a parent leaving a child in the vehicle should result in criminal charges being brought against the parent for endangering the child. As part of this, there is always significant hand-wringing over how a parent could possibly be so forgetful. Talking to many parents that have not yet left a child in a vehicle, the thought of it being accidental is simply unbelievable. Yet, when you talk to a parent that has inadvertently left a child in a vehicle (with whatever consequences) you quickly discover that up until they actually did it, they had a similar opinion.

The simple fact of life in today's world is that it is hectic and many people only get through the day operating purely on habit and routine. There is probably no greater routine breaking event than the birth of a child. Such an event will greatly change the lives of the parents in a myriad of different ways and for anybody who is forced to live a hectic schedule it is easy to see how a parent, simply acting as they did before they had the child, can inadvertently forget that the child is in the back of the vehicle at this particular time. This problem is compounded by the fact that both parents generally share child transportation duties in today's world, and often do so along a relatively random schedule. Therefore, on any given day at any given time either parent may or may not be transporting a child.

Still further, the very features designed to make automobiles safer to operate and to keep children safe in them contribute to the problem. With the addition of airbags and safer car seats, children are now generally placed in the back seat of the vehicle, instead of in the front seat where they were more easily seen by a parent departing the vehicle, particularly if the child is asleep or quiet. Further, with rear facing car seats it can often be difficult to see if the seat is occupied. This all makes it easier for a frazzled parent to forget the child is there. As the old adage goes, "out of sight, out of mind."

While new parents may not be used to thinking about having a child in the vehicle at all, parents of older children can often forget if the child is in the vehicle because the child's car seat or other indications of the child become near permanent fixtures in their vehicle, whether or not the child is present, and routines may not be greatly altered by the presence of the child. Therefore, a change in routine such as when the child is being dropped off at daycare, which parent has the child today, or even a non-standard trip where the child is brought along can result in the child being inadvertently left unattended in the vehicle.

Beyond the child being inadvertently left in the vehicle by a parent, children are also inquisitive and an older child may get into a parked vehicle without a parent knowing. This situation can be just as dangerous as leaving an unattended child in the vehicle, but may be much harder for a parent to detect since the parent was not involved in the child getting into the vehicle originally.

SUMMARY OF THE INVENTION

For these and other reasons there are described herein systems and methods which are designed to provide an alarm or other reminder that a child is likely present in a parked vehicle. These can range from subtle audio reminders designed to remind a parent as they are parking a vehicle that the child is present, to blaring audio and visual reminders to try and trigger the attention of passers-by, to systems designed to detect that a child has gotten into an unattended vehicle on its own.

There is described herein, among other things, a device for providing notice that a child is in a car seat comprising: a pressure sensor; an accelerometer; a notification system; and a controller; wherein if the pressure sensor detects pressure and the accelerometer does not detect movement, the controller activates the notification system.

In an embodiment the device further comprises a temporary disarming switch.

In another embodiment of the device, the pressure sensor is placed in a child seat, such as, but not limited to, a forward facing care seat, a rearward facing car seat, or a booster seat.

In an embodiment of the device the notification system plays sound, such as but not limited to children's songs, when activated. The notification system may also be activated when the pressure sensor goes from detecting pressure to not detecting pressure, either with the same or a different notification.

In another embodiment of the device there is a delay, such as about 15 seconds, after the accelerometer does not detect movement before the notification system is activated.

In another embodiment of the device once the notification system is activated, it waits a preselected amount of time and then activates again. This may provide the same notification, or a different notification, such as to provide an escalating alarm where the later notification is more disruptive than the first.

There is also described herein, a device for providing notice that a child is in a car seat comprising: means for detecting that a child is in a car seat; means for detecting that a the car seat is in motion; and means for notifying which provides notice if the means for detecting the child indicates the child is in the car seat and the means for detecting that the car seat is in motion indicates that it is not.

In embodiments of the device the child seat may be forward facing, rearward facing or a booster seat.

In another embodiment of the device, the means for detecting detects acceleration.

In another embodiment of the device the means for notifying plays a song when it provides notice.

There is also described herein, a method for assisting in the detection of a child in a parked motor vehicle, the method comprising: detecting whether or not a child is in a vehicle; detecting whether or not the vehicle is not in motion; and if the child is in the vehicle and the vehicle is not in motion, generating a notification signal to indicate the presence of the child.

DESCRIPTION OF THE PREFERRED EMBODIMENT(S)

Generally the notification systems (200) and methods discussed herein include four major components which may be arranged in a variety of configurations. Firstly, there is an alarm or reminder (211) which serves as the indicator to determine if an unattended child (101) is present or to act as a reminder that a child (101) may be present and needs to be attended to. The systems and methods also generally include a child detector (201), which serves to determine if there is an increased likelihood of a child (101) being present in a car seat (100) or in the vehicle and therefore it is appropriate to trigger the alarm (211) should the vehicle be parked. The systems and methods also include a detection apparatus (221) whose purpose is to determine if the vehicle is in operation. Generally, these systems (221) are used to determine if the vehicle is in motion. Finally, the system (200) and methods will generally include a processor (231) or similar control apparatus which serves to coordinate and control the various other components and operate the system.

A major problem with prior child detection systems is that they require the vehicle operator to manually arm them or make sure they are switched on when they begin use of the vehicle because otherwise the systems (200) could indicate alerts when the vehicle was simply driving down the road or could be constantly triggering even if the child (101) was not in a car seat (100). The problem with any such system is that it is just as easy to forget to arm the system when the child (101) is using the seat (100), as it is to leave the unattended child (101) in the vehicle. For this reason, a system (200) to act as an alert or reminder should be armed by placement of the child (101) in the car seat (100) and/or by placement of the seat (100) in a vehicle. In this way, when the child (101) is in the vehicle the system (200) is automatically armed.

Figure 2:
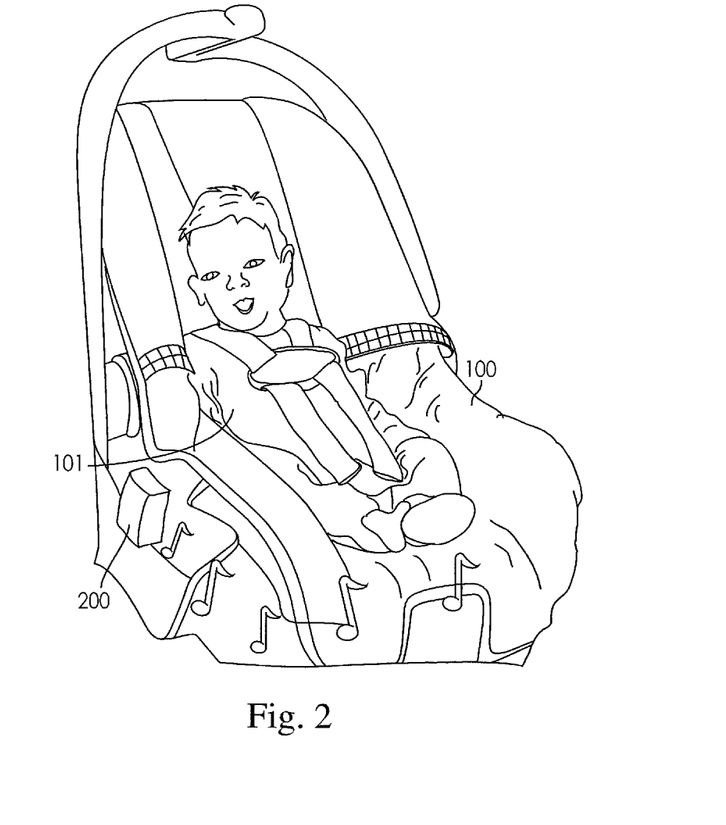
FIG. 2 illustrates a child's vehicle safety seat including an embodiment of a notification system which is in place.

As shown if FIG. 2, systems and methods discussed herein are generally designed to operate in conjunction with the use of a child seat (100) in conjunction with a vehicle. This child seat (100) may be of any type, and for any aged child (101) and may be forward facing, rearward facing, convertible, or a booster seat. The device may be used on car seats (100) which are designed to be left in the vehicle with the child (101) getting out of the seat (100) to leave the vehicle, may be used on car seats (100) which are removed with the child (101) when the child (101) leaves the vehicle, or may be used on car seats (100) which utilize a car adapter where a portion of the car seat (100) is removed with the child (101), but a connector or similar structure is designed to remain in the vehicle.

While it will generally be the case that the device (200) will be used with a child car seat (100), it is by no means required and the systems and devices (200) can operate without need of such a car seat (100) as discussed herein. However, children who are generally old enough to not need any form of car seat (100), are also generally old enough to call for help and/or to extract themselves from the vehicle should they be left. Children (101) in safety seats (100) are much more dependent on their parents as they are less likely to speak out or indicate that they are about to be forgotten, they are often asleep, and they generally cannot reach or operate the car doors to exit the vehicle themselves. Even if they can, they may not be aware that remaining alone in the vehicle is dangerous.

Figure 1:
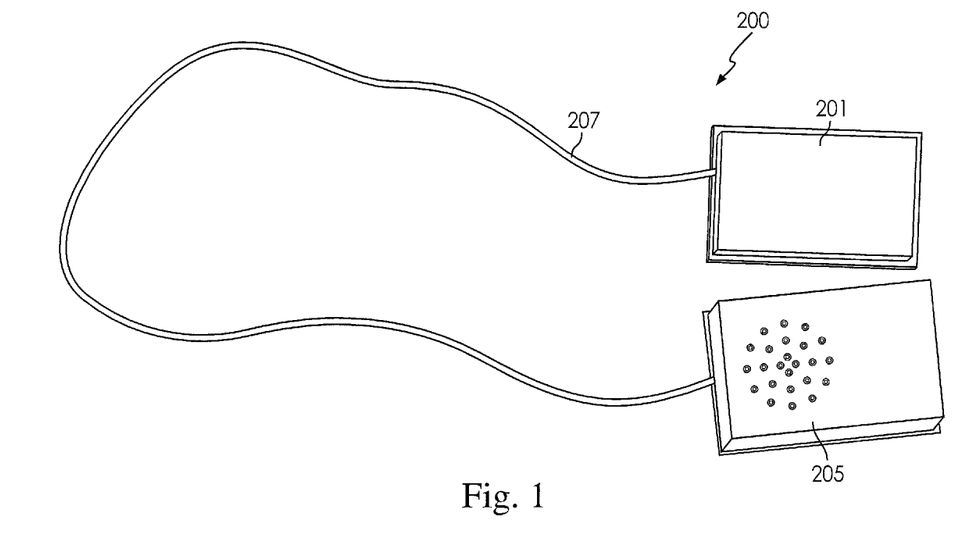
FIG. 1 is a top down view of an embodiment of a notification system.

A first embodiment of a notification device is shown in FIG. 1. This device (200) is generally preferred for use in a forward facing toddler type seat (100) or a booster seat such as for an older child. With such a seat (100) the seat (100) will remain in the vehicle when the child (101) leaves the vehicle and therefore the device (200) will also remain in the vehicle. For this reason, the device's arming system will generally not be able to be manually disabled as possible annoyance from it going off when the seat (100) is in a public place or where it may distract others is very unlikely since the seat (100) is left in the vehicle.

Figure 6:
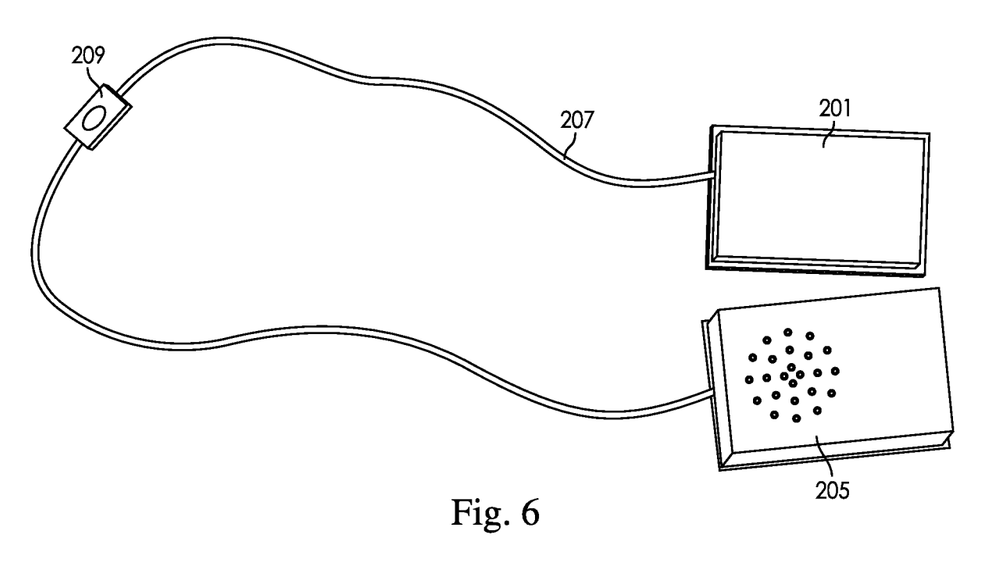
FIG. 6 provides a top down view of another embodiment of a notification system.

The embodiment of FIG. 6 provides for an alternative embodiment to that of FIG. 1 which allows for a manual and temporary disarming of the device (500). However, other than this additional feature, the two devices (200) and (500) generally operate in a similar fashion and similar components of their operation will be discussed together.

Figure 4:
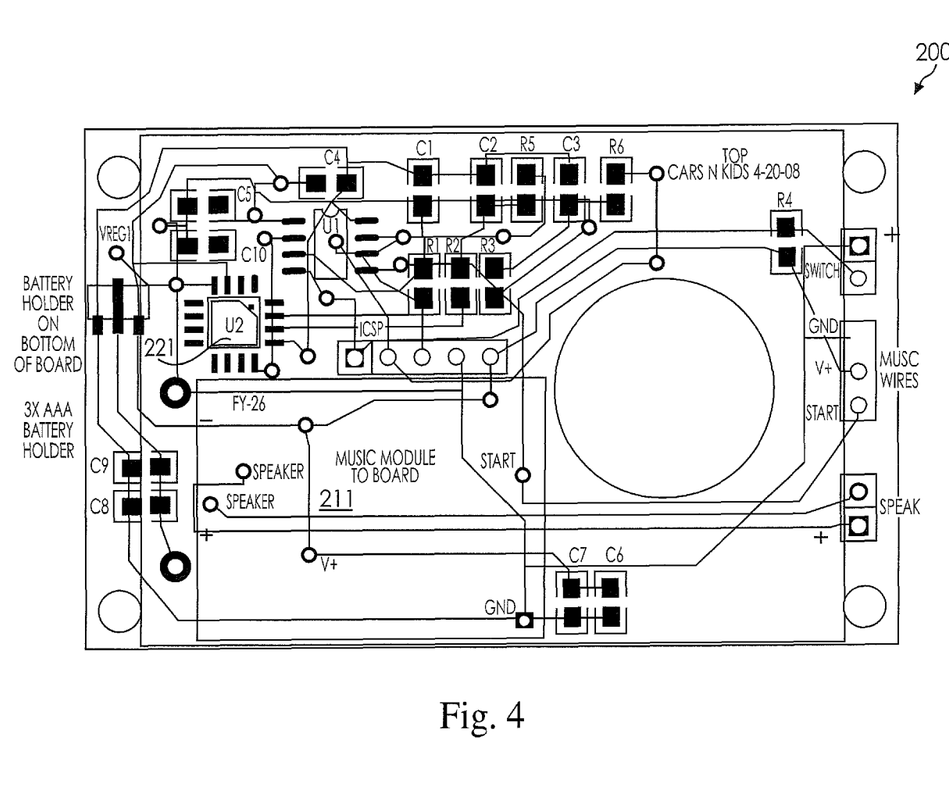
FIG. 4 is a circuit diagram showing an embodiment of a circuit board laying on an embodiment of a notification system.
Figure 5A:
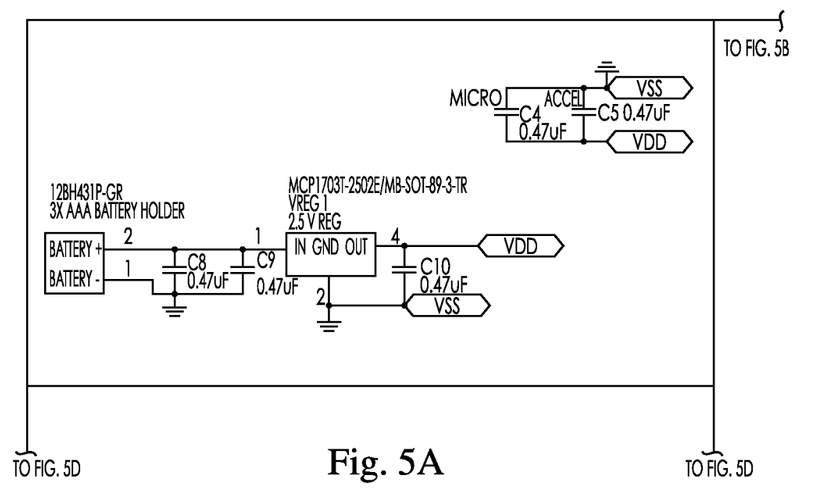
FIGS. 5A, 5B, 5C, 5D, 5E and 5F are a functional electronic diagram of various of the processors and components from an embodiment of electronics.
Figure 5B:
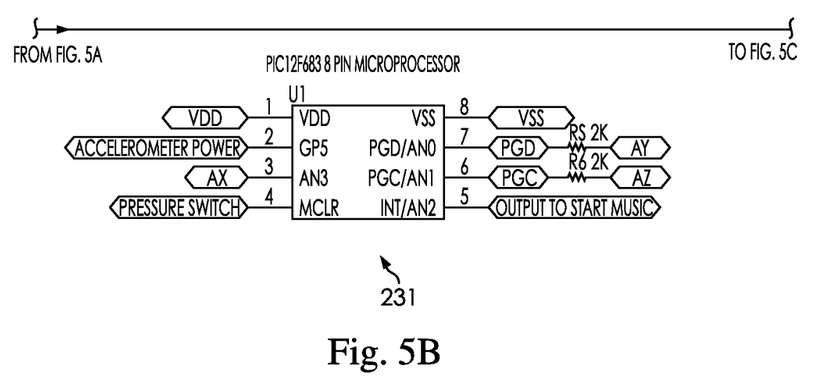
Figure 5C:
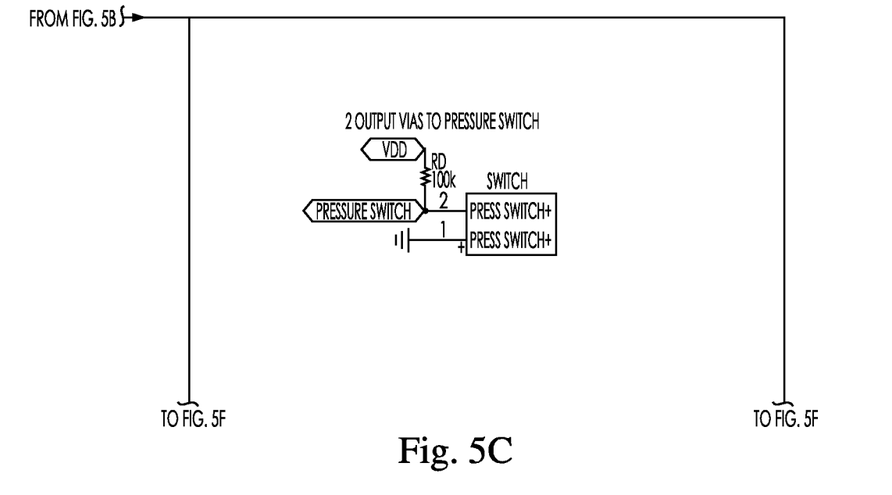
Figure 5D:
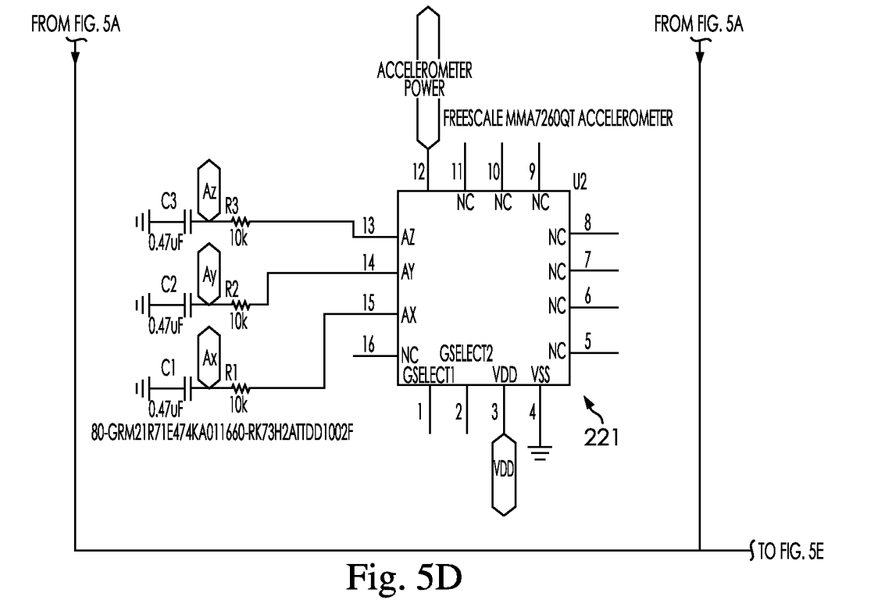
Figure 5E:
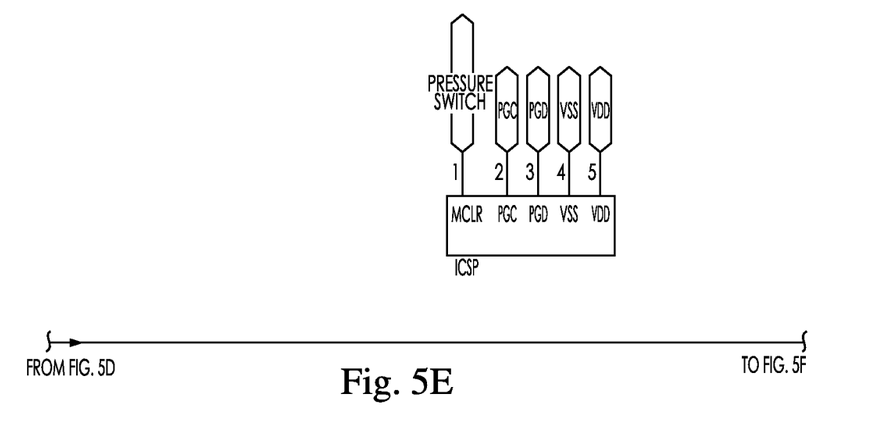
Figure 5F:
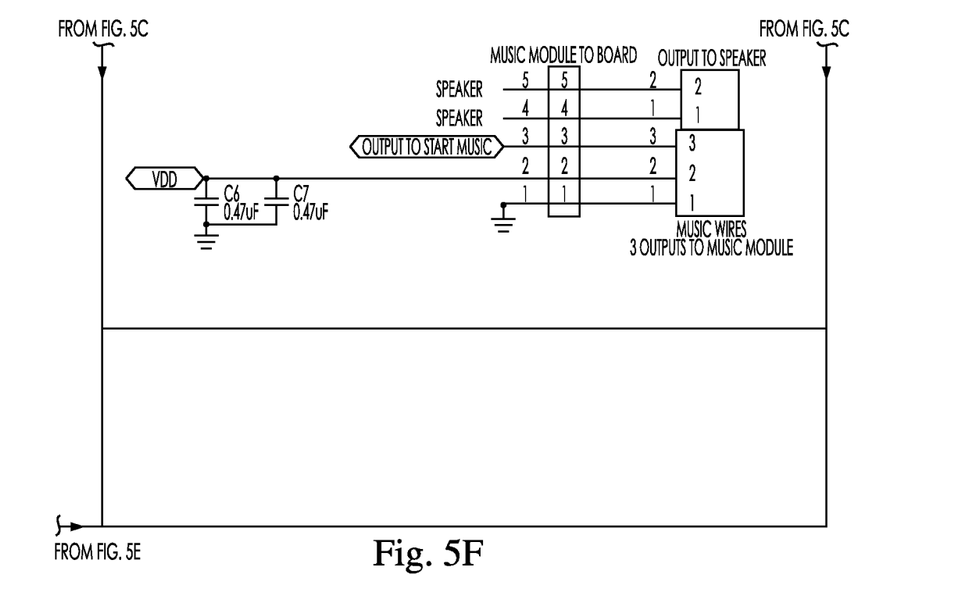

As shown in FIGS. 1 and 2, in this embodiment there is provided a car safety seat (100) into which the child (101) will be placed and appropriately secured. The seat (100) includes a notification system (200) or (500) which is designed to trigger a notification should the child (101) be in the seat (100) and the vehicle be parked. The notification system generally comprises two parts which are connected together. First is a device for detecting (201) the child (101) if a child (101) is in the seat (100). There is also a master housing (205) which includes other electronics. The housing (203) and detector (201) are connected by a wire (207) or other communication system. The master housing (203) will generally include a detector (221) for determining if the vehicle is in operation. In a preferred embodiment the detector (221) comprises a motion detector such as an accelerometer which will temporarily disable the notification (211) if the seat (101) is currently in motion and a processor (231) and associated control electronics for operating the system (200), as well as alarm and/or notification apparatus (211). Contents of the master housing (203) are described in more detail in conjunction with FIGS. 4 and 5.

Figure 3:
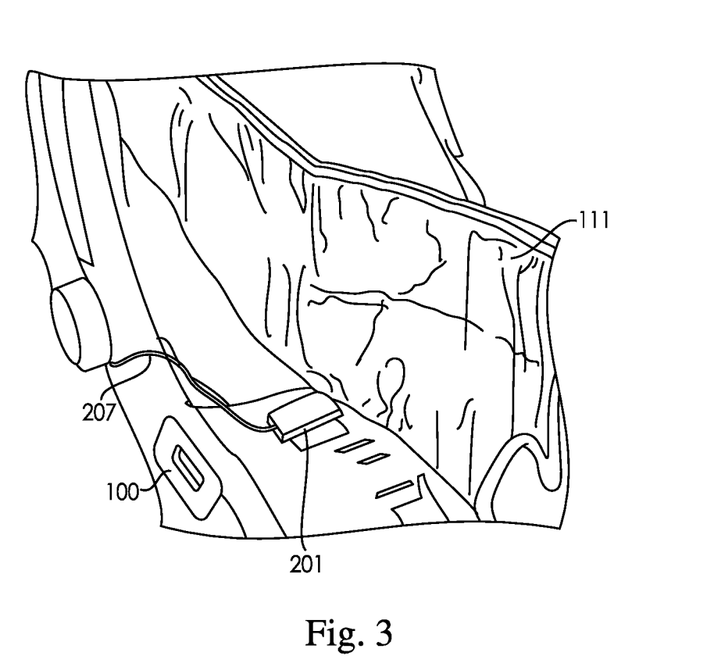
FIG. 3 illustrates a child's vehicle safety seat with the cushion raised to show positioning of the pressure sensitive pad.

As shown in FIG. 3, the detector (201) is designed to be placed in the seat (100) so as to detect the presence of the child (101). In the embodiment of FIG. 3, the detector (201) is a pressure sensor and therefore is placed under the padding of the seat where the child (101) will likely be reclined or sitting. In this way, the weight of the child (101) will activate the pressure sensor (201) to indicate that the child (101) is present in the seat (100).

The system and methods are generally designed to provide for two different situations effectively following a logical chain of operation. If the seat (100) is likely occupied by a child (101) and the vehicle is not currently in motion, the systems and methods are designed to initiate a notification sequence which will result in an alarm situation. Otherwise, the system (200) will generally sleep and not trigger an alarm. In this way the alarm will not be triggered if either, the car seat (100) is unoccupied, or the vehicle is in operation and therefore the parent is likely present and also in the vehicle.

As shown in FIG. 3, the seat (106) generally includes a sensor (201) to detect whether the seat (100) is occupied by a child and therefore if the system (200) should be armed. In a preferred embodiment of the system (200), the system (200) is generally never "off." Instead, the system (200) is always armed and either is indicating notification or the notification is temporarily disabled. However, in an alternative embodiment the system (200) can be turned off for long term storage or disuse. Generally, however, such ability to turn the system (200) off will not be simple and may involve removing a battery (203) or otherwise disconnecting a power source so that it is not done casually or simply.

In one embodiment, the device (200) may include a temporary disarm button (209) which is used so that the device need not be turned off when the seat is removed from the vehicle. This embodiment is depicted in FIG. 6. The temporary disarm (209) may be placed in the master housing (203), or along the wire (207) as shown, and serves to provide for a temporary ability to silence the alarm. This will generally be for a limited amount of time such as fifteen minutes or less. Generally, the disarm (209) will allow the user to indicate a time for disabling the alarm, or to immediately silence the alarm for a period of time. In a still further embodiment, the disarm (209) may be designed to allow the user to add a multiple number of disarms by pushing the button repeatedly, or by entering a specific disarm time to provide for a longer disarm.

The temporary disarm (209) is to allow for the device (200) to be active when the child (101) is in the seat (100) but the seat (100) is not in the vehicle or otherwise being used in a fashion that serves to disable the notification as discussed below. For this reason, the disarm button will generally be used in car seats which are designed for infants (rearward facing) and where the child (101) is removed with at least a portion of the seat (104) in standard operation since it would only be in this situation where such a disarm would be desirable.

This temporary disarm (201) is provided so that the child (101) may remain in the seat (100) with the seat (400) being placed on a stationary surface without the alarm being triggered. In this way, the system (200) is not distracting or annoying because it provides notification when the seat (100) is not in a vehicle. For example, if the system was used in conjunction with driving, the user then arrived at their location and knew that the child (101) was going to remain in the seat (100) but the system (200) may be triggered (for example if the user was in church or at a movie), the user could disarm (209) the system (200) for the amount of time that they would be out of the vehicle, it would then automatically rearm after that time.

In a still further embodiment, the system could include a rearm switch so that if the time spent outside the vehicle was less than was expected, the user could indefinitely rearm the system (200) instead of having to wait out the temporary disarm to time out. In an embodiment, this rearm could occur automatically by the system detecting the child (101) being removed from the seat (100).

In the depicted embodiment of FIG. 1, the system (200) is always on and actively determining the situation. This can be a more useful embodiment when the child (101) is not expected to be in the seat (100) unless they are in the vehicle. In this system the notification (211) is disabled only if the child sensor (201) determines that the seat (100) is unoccupied and therefore there is no need to notify the occupants in the vehicle that there is a child (101) in the seat (100). In the disabled condition, the notification (211) will not generally sound.

The method for determining occupancy can take a variety of forms. In the embodiment of FIGS. 1 and 6, the system for determining occupancy comprises a weight sensitive pad (201). This pad (201) will detect the mass of a child (101) being rested in the seat (100). The existence of such weight (which may be as little as 1 or 2 pounds) in the seat (100) triggers the system (200) to indicate that the seat (100) is occupied and arms the system (200).

In alternative embodiments, other child sensing systems (201) may be used. For instance, a child's body heat, or volume, instead of mass, could be detected. Such a sensor could detect that there is a warm object placed in the car seat (100), or could detect that an object having a particular volume is present. For instance, sufficient to break an invisible "line" between a transmitter and detector on opposing sides of the seat (100). Such sensors may be optical (e.g. an infra red emitter detector pair) acoustic, piezo-electric, force sensitive, capacitive, infra-red, mechanical, or of any other type known to one of ordinary skill in the art.

In one such alternative a motion detector system can be used as the child detector (201). This will generally determine if there is motion in the general area of the seat (100), for instance, as viewed from the back of a front seat. This can be the most optimal detection system for larger children where they may be on a booster seat or more open seat where they can move and possibly move off of a different type of sensor and are less likely to have fallen asleep. In an embodiment, an infra red sensor can be used, although other sensors can be used such as, but not limited to, acoustic, radar capacitive or one could tie into one of the vehicle's existing sensors, transmitters, or vehicle electronic system to establish the presence of an intruder. Examples of this are the airbag sensor used to determine the occupant's size and weight or the sensor used to level the vehicle's suspension or the sensor that detects the presence of an occupant for the seat belt fastener. It should be apparent that a motion sensing system will generally be more useful for larger children (or in an alternative embodiment for pets) where they may not be confined to a car seat.

In a still further embodiment, one would recognize that the system (200) can be operated effectively in reverse to provide an alternative protection system (200). If the parent is concerned about a child possibly undoing a seatbelt or getting out of the seat while the vehicle is moving, an alarm (211) could also be triggered by the sensing of the child (101) moving outside the seat area, or detection that the child is no longer in the seat (100). This alternative mode of operating can simply provide for a different notification sound in the embodiments of FIGS. 1 and 6 when the pressure switch (201) is released indicating that the child is no longer in the seat (possibly by having an alternative sensor that detects unlatching of the seatbelt). This detection may occur while also detecting that the vehicle is in motion or not. This embodiment and operational method may be particularly beneficial for slightly older children where the risk of them being left unattended is decreased, but their increased independence could result in such a dangerous situation with them not being properly restrained. In an embodiment, the system (200) may include the ability to switch between these modes so as to provide for increased functionality or to operate in both modes simultaneously.

Child detection systems (201), such as those discussed above can be used singly, or in combination, depending on the embodiment, to arm the system (200). For example, a mass sensor may be used to detect the presence of a small child in a carrycot or other hand carrying portion of a car seat (100). A volume detector may then be used to determine if the carrycot or hand carrying portion has been connected to a mounting system located in the vehicle which is designed to secure the child (101) in the vehicle without need of transferring the child (101) between carriers. Unless both systems indicate the presence of the child, then the system (200) remains disarmed. In this way, a child (100) does not need to be removed from the seat to disarm the device as the parents would normally remove a portion of the seat and the child instead. Further, this type of arrangement also provides that the manual disarm (209) of FIG. 6 may not be necessary on such a seat (100).

In the depiction of the FIGS, there is also provided a reminder or notification (211). The reminder system (211) is generally an audible system which is designed to produce an audible reminder that there is a child in the vehicle. However, the alarm (211) may comprise audible, tactile, visual, electronic, or any other stimulant reminder that the child is present in the vehicle. The reminder system (211), depending on embodiment, can comprise a subtle but specific reminder of the presence of the child all the way to a shrieking alarm system designed to attract the attention of passers-by to examine the vehicle and possibly rescue a child which has been inadvertently left in the vehicle. The system can also include multiple different alarms, such as to provide for an escalating alarm system. In one such embodiment, the system may provide a subtle reminder for a period of time purely within the cabin of the vehicle. If the child (101) has not been removed within this period of time, the system (200) may escalate to a longer ranged alarm such as calling a parent's cellular phone. In the event that the child (101) has still not been removed, the system (200) may initiate an alarm designed to alert passers-by to locate the vehicle's owner or determine if an unattended child is in the vehicle. In an embodiment this could comprise triggering the vehicle's anti-theft system, for example, or could provide for external speakers.

The alarm system (211) may be self contained and external to the vehicle's electronics communicating via wire or wireless methods with the remaining components of the system (200), may be integrated with the vehicle's existing electronics (e.g. so as to allow the vehicle's horn to sound upon an alarm condition), or may interface with other objects the parent may have, such as a cellular phone, pager, or other wireless device that they are likely to have with them.

The system (200) could communicate via wireless communication and or hard wire to the alarm (211) based somewhat on the design and the type of alarm system (211) that is to be activated. In the depicted embodiment of the FIGS the alarm (211) comprises a subtle reminder system.

In this case, there is generally little to no delay on the vehicle operation sensing system (221) and therefore the system (200) will generally trigger as soon as no vehicle acceleration is detected. In the depiction of the FIGS, the alarm (211) comprises a speaker and associated electronics with a memory of classic children's songs (such as lullabies). Upon detection that the system (200) is armed and the vehicle is not accelerating, the alarm (211) will play a brief excerpt (from between 15 and 30 seconds in an embodiment) of a song. This reminder will be transmitted via an attached speaker and will generally only be audible to a vehicle's occupants or those nearby if a door or window on the vehicle was open. This type of alarm (211) is designed to be subtle and non-intrusive while still serving as a reminder of the presence of the child (101). The reminder is particularly useful because since it is non-obtrusive it can sound repeatedly without being an annoyance. For example, the system (200) will generally sound each time the vehicle comes to a stop, such as at a stop light to remind the parent that the child (101) is in the vehicle. The system (200) will also sound when the vehicle is parked serving as another reminder to remove the child (101). Once the notification has sounded, it may enter a wait mode where it will not notify for a longer period of time. If no movement has been detected, it may sound again. In this way the system does not become annoying if the vehicle is stopped at a stoplight, while still making sure that notification is given.

As also depicted in the FIGS, the third major component of the system is a system for detecting whether the vehicle is in operation (221). This system (221) effectively serves to inhibit the notification (211) from sounding while the vehicle is in operation, while at the same time not turning off or disarming the system (200). In this way the alarm (211) is effectively disabled from sounding when it is undesirable for it to sound. The presence of a child in a car seat (100) within a vehicle which is in operation is generally not an issue as the parents are also present and the child (101) is not unattended.

There are a number of ways to determine if a vehicle is in operation. One is to detect that the engine is operating. This however, is not necessarily ideal because it is possible for a child (101) to be left in a vehicle which is running, but parked, resulting in the child (101) still being unattended. Instead, a more powerful determination system is to determine if the vehicle is in motion. If the vehicle is moving, in the vast majority of situations, it will be doing so at the command of the driver who will also be present in the vehicle. If the vehicle is stopped, there may or may not be a caretaker present in the vehicle and therefore the commencement of possible alarm situations is desired.

To detect that the vehicle is not in operation, the embodiment of the system (200) depicted in the FIGS includes a motion sensor (221) which is used to establish if the vehicle is moving or not. Specifically, in the depicted embodiment, the motion sensor comprises an accelerometer (221) which is designed to detect the acceleration of a vehicle which may be in any dimension and any number of dimensions. However, one of ordinary skill in the art would understand that other types of motion sensors could be included such as, but not limited to, remote positioning systems (such as GPS), inertial systems such as gyroscopes, infra red, capacitive, or acoustic sensors. Still further systems designed to detect the vehicle's operation, but not necessarily motion could be used such as wireless transceivers for detecting a vehicle's wireless signals or a transceiver tied into the vehicle's electrical system or the other sensors used to establish speed or engine function or to monitor battery voltage for fluctuations that occur during starting and or stopping the vehicle. Still further, acoustic or vibration sensors could be used to detect engine or vehicle noise or vibration indicative of a running or moving vehicle.

The accelerometer (221) can be a beneficial system because it will trigger the alarm (211) whenever the vehicle comes to a halt, or is otherwise not accelerating. Further, the accelerometer (221) is simple, robust, and while sensitive to the stopping of the vehicle, and will generally not trigger an alarm situation while the vehicle is in motion even if the motion is erratic or very slow. Even under the command of cruise control or other computer aided piloting programs, a vehicle's speed is rarely perfectly constant when it is in motion, but instead there are slight fluctuations in the speed over time. These small accelerations will generally result in the alarm system (211) not being activated while the vehicle is in motion. At the same time, a vehicle at rest will rarely incur any acceleration and the alarm (211) is therefore reliably activated. It should also be noted that in an alternative embodiment, the accelerometer (221) and or control (231) can be further refined to recognize acceleration more specific to a vehicle being in motion. For example, it may detect acceleration along a particular axis, or in accordance with a particular rate or curve.

The control (231) is generally a processor or similar device which serves to control operation of the various components. It may, in an embodiment, include a delay to determine if an alarm (211) should sound based on activation by the accelerometer (221). While in one embodiment as discussed above the alarm (211) is designed to sound after only a few seconds without acceleration being detected, if the alarm (211) was designed to be more obtrusive this is undesirable. The delay chosen will, therefore, generally depend on the nature of the alarm (211) that is present. In the event the alarm (211) is a subtle reminder type of alarm (211), the control (231) may include no or little delay. In this way, whenever the vehicle comes to a complete stop, the driver is reminded of the presence of the child. In effect, the system (200) provides a much more constant reminder. If the alarm (211) is more intrusive, the delay may be for a longer period of time. In this way, the alarm (211) is not generally triggered at a stop light or other stopping situation where the vehicle is stopped, but not parked, but will trigger if the vehicle is parked and remains so for a reasonable period of time. In another embodiment, the control may include memory for storage of alarm conditions, operational or test software, or other executable instructions for the processor.

So as to illustrate alternative operations of the system, two different exemplary operations will be described.

In the first system the device (200) is designed to utilize two motion detectors (221) in conjunction with each other. The first motion detector (an accelerometer in this embodiment) determines if the vehicle is not in operation and if so arms the system, the second motion detector (201) is used to determine if there is motion within the vehicle (indicating the presence of an unattended child (101)) and trigger the notification (211).

In an operation of the system (200) in this example, an embodiment of an accelerometer (221) may work as follows. If the accelerometer (221) output changes by more than 0.1 g or 60 millivolts in any 200 millisecond period and outputs acceleration in the same direction for each of the 67 millisecond periods during this 200 millisecond period, it can be determined that the vehicle is moving. A determination of movement results in a timer in the control (which may be on the order of 120 seconds) is reset to zero seconds. If the timer reaches 120 seconds and the vehicle is determined to not be moving at that time (and/or has not moved during that time) the second motion sensor (201) is activated and monitored. At this point it is assumed that the vehicle is probably no longer in operation so the system needs to determine if a child (101) is present in the vehicle. This embodiment therefore does not arm the system (200) from the child's (101) presence, but instead arms the system (200) from the vehicle being determined to not be in operation.

The logic over the 200-millisecond period on the accelerometer (211) can be to differentiate between a child (101) moving in a seat (100) which may provide some acceleration to the seat (100), which may be picked up by the accelerometer (221), and the vehicle moving, which is also picked up by the accelerometer (221).

Movements by a child (101) (or other human interacting with the car seat) generally generate short acceleration spikes typically less than 67 milliseconds in duration. These spikes randomly accelerate and decelerate within the 67-millisecond period. In effect, the acceleration is "jerky." A vehicle that is moving on the other hand typically exhibits a gradual increase in acceleration (in the same direction with little or no deceleration present) for periods longer than 200 milliseconds. The control system in this embodiment, is constantly looking for these cases to establish if the car is sitting still and is disregarding other possible acceleration such as a child (101) moving in the seat (100) or the seat (100) being moved by something other than vehicle motion. It should be understood that through filtering in software or hardware the control (231) could filter out the child (101) moving and the same motion detector (221) may be used for both purposes in some embodiments.

The choice of delay in this case is to allow time to turn the vehicle off and remove the keys, gather belongings, remove the child, and exit the vehicle (which has been found to be approximately 120 seconds). In the currently discussed embodiment, if no vehicle motion that is consistent with a properly started, running, or rolling vehicle is detected from the accelerometer (221) for 120 seconds a second motion detector is enabled to detect the presence of a child (101) in the vehicle. When the control (231), which in this case is a microprocessor, senses a change in the output of this second motion sensor, it enables and starts another 120-second timer that counts the number of changes that occur in the next 120 seconds. If the microprocessor (231) senses a preselected number of changes during this window or if the initial pulse is continuously low for the period, the control determines that an unattended child (101) situation may exist and an alarm signal is transmitted to the alarm system (211), sounding an alarm.

If a child (101) were left in an unattended vehicle that does not have the ignition on, the alarm would therefore generally activate 240 seconds after the vehicle was parked. If a child (101) entered an unattended vehicle and was detected by the motion sensor (221) or the car seat detector (201) without having the ignition on, the vehicle's alarm (211) would sound within around 120 seconds. If the vehicle is sitting still (parked) while the engine is running the alarm (211) will still enable itself after 120 seconds and after an additional 120 seconds with child (101) continuously present in the vehicle, it will also trigger the alarm (211).

In the case of the alarm sounding it may be able to be deactivated (effectively resetting the timers) via a remote device or device connected to the system to prevent an annoyance alarm.

In a second exemplary embodiment, the device of FIG. 1 is used and comprises a weight sensor (201) to detect the child in conjunction with an accelerometer (221) to detect vehicle motion. In this case, the weight sensor (201) serves to arm the system (200). If there is not detected to be sufficient weight in the seat (100) to activate the system (200), the system (200) remains in a disarmed state and the alarm (211) will not trigger. Once the system (200) is armed, the control system (231) will activate and monitor the output of the accelerometer (221). So long as vehicle acceleration is detected as discussed above, the control (231) will not trigger an alarm (211). As soon as vehicle acceleration is not detected, a short timer (for example 5 seconds) is begun. In this way, false alarms such as if the vehicle is cruising at a relatively static speed are prevented. If the vehicle has not moved in the short delay period, the alarm (211) is sounded by the control (231). In this case, playing a children's song via the speaker internal to the passenger compartment of the vehicle. Once a short song has played, the system (200) control (231) will go into a hold mode and a longer delay (for instance 30 seconds) will be allowed to pass to determine if the vehicle motion has resumed. If it has not, the notification (211) may be sounded by the control (231) again. If motion is detected in the hold period, the system (200) will generally reset. A number of such hold periods may be used sequentially providing reminders to a parent as they are leaving their vehicle.

Further in this embodiment, when the child moves off of the sensor (201), the control system (231) will also detect that the system (200) is to disarm and will also trigger a notification (211) to identify that the system (200) is disarming. In this embodiment, the notification (211) plays a series of beeps or chirps to indicate that the system (200) is disarming. If the parent has purposefully removed the child (101) from the seat (100), this notifies them that the system (200) has disarmed and will not annoy them. If the child (101) is expected to still be in the seat this provides an immediate warning to the parent that they may need to stop the vehicle and check on the child (101).

While not depicted in the FIGS, in the event that a predetermined number of alarms have sounded indicative that the child (101) may not have been moved (for example 300 seconds has elapsed since the initial alarm) and the parent may no longer be present, the control (231) may escalate the alarm. In an embodiment, this comprises activating a wireless transmitter that contacts a parent's cell phone or a device such as a Bluetooth™ receiver provided with the system and which the parent is supposed to have with them at all times. The system (200) may then wait for a response. If the parent knows this to be a false alarm, they may indicate on their wireless device resetting or disarming the system (200). If the system (200) does not receive a response from the parent, the system (200) may escalate further and possibly sound an external alarm on the vehicle trying to attract the attention of passers-by to get them to break into the vehicle and rescue the child (101).

It should be noted that one advantage of using an accelerometer (221) sensitive to vehicle motion to reset a system (200) with an escalating or other external alarm is that it allows a vehicle occupant to easily reset a false alarm. For example, should the parent be stuck in traffic and the alarm be escalating or sounding, they can easily reset the timers by simply allowing the vehicle to roll forward a short distance, which motion is detected and the system and results in a reset. Further, even in heavy traffic it is unlikely that the vehicle will not be moving at all naturally inhibiting alarm escalation.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A child car seat and notification device, in combination, comprising:
   a sensor integral with said child car seat;
   an accelerometer;
   a notification system; and
   a controller;
   wherein
   if said sensor detects a child in said child car seat and said accelerometer detects repeated acceleration along a fixed axis, then said controller does not activate said notification system; and
   if said sensor does not detect a child in said child car seat and said accelerometer detects repeated acceleration along a fixed axis, then said controller activates said notification system to provide a first notification.

2. The combination of claim 1 wherein if said sensor does detect a child in said child car seat and said accelerometer does not detect repeated acceleration along a fixed axis, then said controller activates said notification system to provide a second notification.

3. The combination of claim 2 wherein said first notification and said second notification are the same.

4. The combination of claim 2 wherein said first notification and said second notification are different.

5. The combination of claim 1 wherein said sensor is a pressure sensor.

6. The combination of claim 1 wherein said sensor is an optical sensor.

7. The combination of claim 1 wherein said sensor detects that a buckle has been fastened about said child.

8. The combination of claim 1 wherein said accelerometer is not integral to said car seat.

9. The combination of claim 1 wherein said controller is not integral to said car seat.

10. The combination of claim 1 wherein said notification system is not integral to said car seat.

* * * * *